(No Model.)
F. KRIECKHAUS.
SELF MEASURING CAN FOR LIQUIDS.
No. 460,251. Patented Sept. 29, 1891.
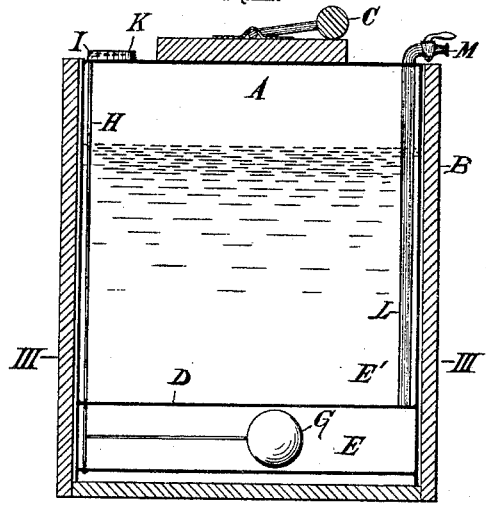
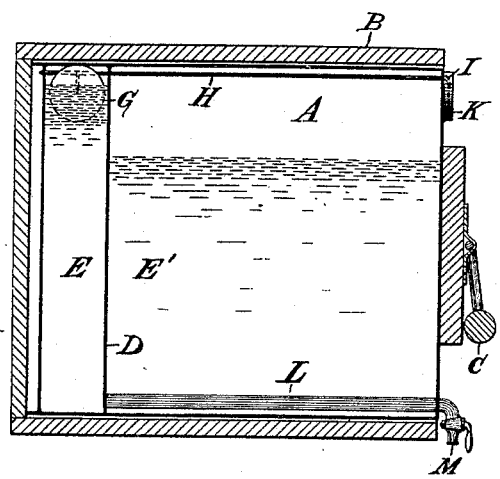
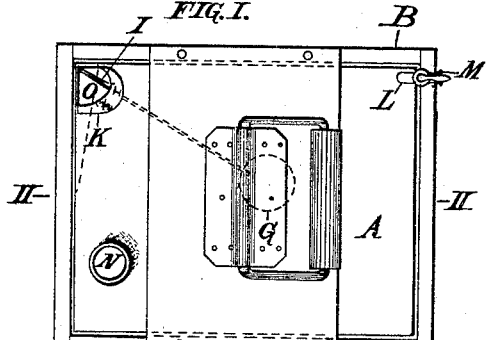
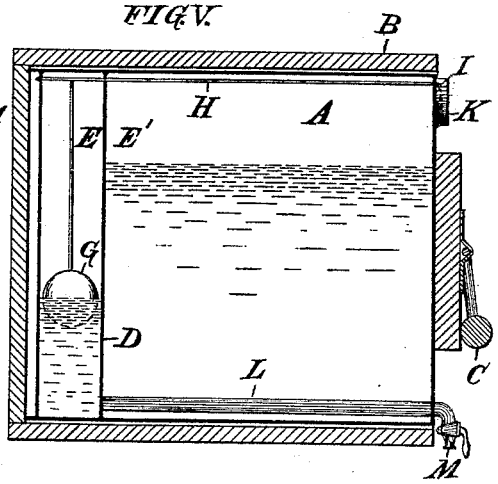
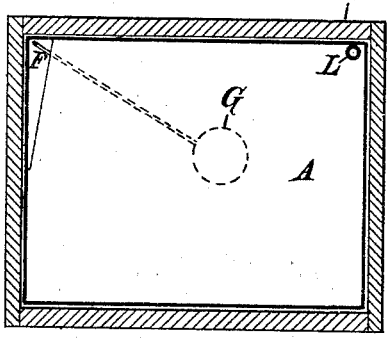
WITNESSES.
A. Ramel
Jos. W. Crookes
INVENTOR.
Fredrick Krieckhaus
by Paul Bakewell
his Attorney

UNITED STATES PATENT OFFICE.

FREDRICK KRIECKHAUS, OF ST. LOUIS, MISSOURI.

SELF-MEASURING CAN FOR LIQUIDS.

SPECIFICATION forming part of Letters Patent No. 460,251, dated September 29, 1891.

Application filed March 2, 1891. Serial No. 383,342. (No model.)

*To all whom it may concern:*

Be it known that I, FREDRICK KRIECKHAUS, a citizen of the United States, residing in the city of St. Louis and State of Missouri, have invented certain new and useful Improvements in Liquid-Containing Cans, of which the following is a full, clear, and exact description.

My invention relates to closed vessels for containing liquids, more particularly oils, &c., from which their contents are drawn for use or sale; and it consists in devices in such containing-vessels by which the quantity of liquid withdrawn therefrom is measured and indicated.

It has for its object to facilitate the withdrawal of a desired quantity of liquid from such a receptacle and to simplify by making the same self-measuring the work of measuring comparatively small quantities of liquid from a supply-can, as, for instance, is often required when a customer wants only a small quantity of oil from the delivery-wagon in which is carried a supply-can.

In the accompanying drawings, in which like letters of reference denote like parts in the several figures, Figure 1 is a top view of a "square" oil-can. Figs. 2, 4, and 5 are sectional views taken as on the line II II in Fig. 1, taken in Fig. 2 with the can in an upright position, and in Figs. 4 and 5 with the can turned on its side, as when the oil is being withdrawn therefrom, showing, respectively, the level of the oil in the two compartments and the position of the operative parts, hereinafter described, before any oil is withdrawn and after a portion is withdrawn; and Fig. 3 is a cross-section taken as on the line III III in Fig. 2.

The can A, to which I have applied my invention, and of which the drawings are an illustration, is a square oil-can provided with a wooden jacket B and a handle C for protecting and for conveniently handling the same. I place within the can A a diaphragm D, dividing the interior of the can A into two compartments E and E', hermetically sealing the said diaphragm D to the sides of the can A, except along one edge or a portion of one edge, having an opening F communicating between the two compartments E and E'. The diaphragm is so placed that the compartment E is of a definite capacity—as, for instance, to hold one quart in a two-gallon can. In this compartment E is placed a float G, which is secured on the end of an arm, the arm being pivotally secured to the body of the can and rigidly to a rod H, which extends to the exterior of the can and is provided with an index-pointer I, the pointer turning with the float G and indicating on the index-plate K the position of the same about its axis of revolution within the compartment E. One end of a small conduction-pipe L is hermetically secured in a perforation formed therefor near the edge of the diaphragm D opposite the edge of the same, in which is formed the opening F. This pipe L extends from within the compartment E to the exterior of the can A and is provided with a petcock M or other means for closing the opening through the same and controlling the flow of oil therethrough.

N in Fig. 1 is a hole with cap-cover for pouring the oil into the can. The hole in the top of the can through which the rod H protrudes is made somewhat larger than is necessary to accommodate the rod and will act as a vent-hole. If any of the oil should be spilled out of the small opening through which the rod H protrudes when the can is tilted to the positions shown in Figs. 4 and 5, it is caught in the cup-shaped receptacle O, formed around the hole by a raised wall, to the upper edge of which is secured the index-plate K, which acts as a partial covering to retain the oil within the same until the can is tilted back to its upright position, when it will run back into the can, in this way preventing any dripping of the oil therefrom.

The operation of my improved can is as follows: The can having been filled with oil through the opening N, the oil will flow through the diaphragm-opening F, filling up the compartment E, presuming that the can is in the upright position shown in Fig. 2 and that the diaphragm D is so placed that the measuring-compartment E is at the bottom of the can A. If the can is then tipped to the position shown in Fig. 4—that is, keeping the opening F on the top side—the compartment E will remain full even when the quantity of oil in the can is not sufficient to keep the level of the same in the compartment E' as high as that in the compartment E, as shown in Fig. 4. If now the cock M is opened, the oil in E can be withdrawn from the can independently of the oil in the body E′ of the can, the quantity being that of the capacity of the compartment as made. At any time the index-pointer I will indicate the height of the oil within the compartment E, the index-plate K being graduated to indicate definite fractional quantities of the capacity of the compartment E, as one-quarter, one-half, &c. In this way, if it is desired to withdraw a quantity of oil from the can less than that contained in the measuring-compartment E, the flow is shut off at M, when the index-pointer indicates, by showing the height of the float G, and with it the level of the oil in E, that the desired quantity has been withdrawn. When it is desired to again refill the compartment E, the can is simply tipped to its normal or upright position—that position, in any instance, of the can by which a free communication for the contained liquid is afforded through the opening F. It will be seen that the operation of withdrawing the oil when the can is in the position shown in Figs. 4 and 5 from the compartment E, independently of the oil still in the body E′ of the can is dependent on the fact that the opening F is on the upper side of the can and above the level of the oil in E′, communication between the two compartments being shut off by the diaphragm D. It will be evident that I might extend the idea of forming the separate compartment of definite capacity and subdivide the same into several smaller compartments, making each one of a definite and relatively different capacity, providing each with a separate pipe for withdrawing the oil therefrom, such as is shown and described for the one compartment.

I claim—

1. In a containing-can for liquids, a diaphragm dividing the same into two compartments, one of said compartments being of a definite capacity, said diaphragm being formed with an opening in one portion of the edge thereof communicating between said two compartments and at a point opposite the said communicating opening a perforation into which is hermetically secured the end of a pipe extending from the interior of said compartment of definite capacity to the exterior of the can, said pipe being provided with a cock for controlling the flow of the liquid therethrough, substantially as described, and for the purposes specified.

2. In a containing-can for liquids, a diaphragm dividing the same into two compartments, one of said compartments being of a definite capacity, an opening communicating between said two compartments, a pipe leading from the interior of said compartment of definite capacity to the exterior of the can, provided with a controlling-cock, and a float secured within said compartment of definite capacity capable of following the level of the liquid in said compartment, said float being mechanically connected with an index placed exterior to said can, combined and operating substantially as described, and for the purposes specified.

3. In a containing-can for liquids, can A, diaphragm D, opening F, pipe L, and cock M, combined and operating substantially as described, and for the purposes specified.

4. In a containing-can for liquids, can A, diaphragm D, opening F, pipe L, cock M, float G, index-pointer I, and index-plate K, combined and operating substantially as described, and for the purposes specified.

In testimony whereof I have affixed my signature, in presence of two witnesses, this 23d day of February, 1891.

FREDRICK KRIECKHAUS.

Witnesses:
A. RAMEL,
N. JOHNSON.